US012547945B2

(12) United States Patent
Odi et al.

(10) Patent No.: US 12,547,945 B2
(45) Date of Patent: Feb. 10, 2026

(54) DEW POINT PRESSURE PREDICTION USING ISOTHERMAL CONSTANT COMPOSITION EXPANSION AND ARTIFICIAL INTELLIGENCE

(71) Applicant: Saudi Arabian Oil Company, Dhahran (SA)

(72) Inventors: Uchenna Odi, Houston, TX (US); Anuj Gupta, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 910 days.

(21) Appl. No.: 17/696,443

(22) Filed: Mar. 16, 2022

(65) Prior Publication Data

US 2023/0297893 A1     Sep. 21, 2023

(51) Int. Cl.
*G06N 20/10* (2019.01)
*E21B 41/00* (2006.01)
*G06F 30/27* (2020.01)

(52) U.S. Cl.
CPC ............. *G06N 20/10* (2019.01); *E21B 41/00* (2013.01); *G06F 30/27* (2020.01)

(58) Field of Classification Search
CPC ........ G06N 20/00; G06N 20/10; G06N 20/20; G06F 30/18; G06F 30/27; G06F 30/28; E21B 41/00; E21B 44/00
See application file for complete search history.

(56) References Cited

U.S. PATENT DOCUMENTS

| 4,113,011 A | 9/1978 | Bernard et al. |
| 4,665,981 A | 5/1987 | Hayatdavoudi |

(Continued)

FOREIGN PATENT DOCUMENTS

| CA | 2856274 | 5/2016 |
| EP | 3958271 A1 | 2/2022 |

(Continued)

OTHER PUBLICATIONS

Alcorn et al., "An Integrated Carbon-Dioxide-Foam Enhanced-Oil-Recovery Pilot Program With Combined Carbon Capture, Utilization, and Storage in an Onshore Texas Heterogeneous Carbonate Field," SPE Reservoir Engineering, Nov. 2019, 22:04 (1449-1466), 18 pages.

(Continued)

*Primary Examiner* — Shane D Woolwine
(74) *Attorney, Agent, or Firm* — Fish & Richardson P.C.

(57) ABSTRACT

A computer-implemented method that enables dew point pressure prediction using isothermal constant composition expansion and artificial intelligence is described herein. The method includes obtaining constant composition expansion data of a reservoir fluid, and predicting saturation pressures for the reservoir fluid at the constant composition expansion data points using a trained machine learning model selected from multiple machine learning models that are trained using data from a generated constant composition expansion library. The method also includes determining a central tendency of the predicted saturation pressures to obtain a final saturation pressure corresponding to the constant composition expansion data for the reservoir fluid. In examples, the final saturation pressure is a dew point pressure of the reservoir fluid

21 Claims, 5 Drawing Sheets

(56) References Cited

U.S. PATENT DOCUMENTS

| | | |
|---|---|---|
| 4,676,313 A | 6/1987 | Rinaldi |
| 4,828,032 A | 5/1989 | Teletzke et al. |
| 5,794,316 A | 8/1998 | Anscher |
| 5,854,991 A | 12/1998 | Gupta et al. |
| 6,691,037 B1 | 2/2004 | Poe et al. |
| 7,082,993 B2 | 8/2006 | Ayoub et al. |
| 7,134,492 B2 | 11/2006 | Willberg et al. |
| 7,472,748 B2 | 1/2009 | Gdanski et al. |
| 7,777,606 B2 | 8/2010 | Akbar et al. |
| 7,819,181 B2 | 10/2010 | Entov et al. |
| 7,937,222 B2 | 5/2011 | Donadille et al. |
| 8,162,049 B2 | 4/2012 | Rose |
| 8,275,593 B2 | 9/2012 | Zhao |
| 8,498,852 B2 | 7/2013 | Xu et al. |
| 8,606,524 B2 | 12/2013 | Soliman |
| 8,731,889 B2 | 5/2014 | Du et al. |
| 8,803,077 B2 | 8/2014 | Schmidt |
| 9,075,038 B2 | 7/2015 | Tumiatti et al. |
| 9,470,086 B2 | 10/2016 | Khalid et al. |
| 9,732,592 B2 | 8/2017 | Carvajal et al. |
| 9,784,081 B2 | 10/2017 | Blom et al. |
| 10,125,586 B2 | 11/2018 | Balan et al. |
| 10,260,319 B2 | 4/2019 | Sarduy et al. |
| 10,859,725 B2 | 12/2020 | Dupont et al. |
| 2003/0071988 A1 | 4/2003 | Smith et al. |
| 2007/0272407 A1 | 11/2007 | Lehman et al. |
| 2008/0091396 A1 | 4/2008 | Kennon et al. |
| 2009/0065253 A1 | 3/2009 | Suarez-Rivera et al. |
| 2009/0164188 A1 | 6/2009 | Habashy et al. |
| 2010/0185422 A1 | 7/2010 | Hoversten |
| 2010/0256964 A1 | 10/2010 | Lee et al. |
| 2010/0300684 A1 | 12/2010 | Kotsonis et al. |
| 2011/0042083 A1 | 2/2011 | Sierra et al. |
| 2011/0272151 A1 | 11/2011 | Matzakos |
| 2012/0016649 A1 | 1/2012 | Thambynayagam et al. |
| 2012/0037363 A1 | 2/2012 | Curole |
| 2012/0239363 A1 | 9/2012 | Durrani et al. |
| 2012/0318500 A1 | 12/2012 | Urbancic et al. |
| 2013/0087328 A1 | 4/2013 | Maida, Jr. et al. |
| 2013/0231910 A1 | 9/2013 | Kumar et al. |
| 2013/0332132 A1 | 12/2013 | Mongalvy et al. |
| 2014/0067353 A1 | 3/2014 | Shelley et al. |
| 2014/0083687 A1 | 3/2014 | Poe et al. |
| 2014/0172382 A1 | 6/2014 | Andrews et al. |
| 2014/0180658 A1 | 6/2014 | Rossi et al. |
| 2015/0370934 A1 | 12/2015 | Pride et al. |
| 2016/0042272 A1 | 2/2016 | Mohaghegh |
| 2016/0138371 A1 | 5/2016 | Loaiza et al. |
| 2016/0282881 A1 | 9/2016 | Filippov et al. |
| 2016/0356125 A1 | 12/2016 | Bello et al. |
| 2017/0074770 A1 | 3/2017 | Fourno et al. |
| 2017/0075001 A1 | 3/2017 | McColpin et al. |
| 2017/0075028 A1* | 3/2017 | Bang .................. G01N 33/2823 |
| 2017/0191348 A1 | 7/2017 | Al-Thawad et al. |
| 2018/0038211 A1 | 2/2018 | Okuno |
| 2018/0230782 A1 | 8/2018 | Pankaj et al. |
| 2019/0219558 A1 | 7/2019 | Villar De Andrade E Silva et al. |
| 2019/0292881 A1 | 9/2019 | Zhang et al. |
| 2021/0095563 A1 | 4/2021 | Gupta |
| 2022/0049589 A1 | 2/2022 | Kibodeaux et al. |
| 2022/0364465 A1* | 11/2022 | Molla ....................... G06N 3/04 |

FOREIGN PATENT DOCUMENTS

| | | |
|---|---|---|
| WO | WO 199850680 | 11/1998 |
| WO | WO 2001080043 | 10/2001 |
| WO | WO 2006059057 | 6/2006 |
| WO | WO 2014144917 | 9/2014 |
| WO | WO 2015016932 | 2/2015 |
| WO | WO 2015167935 | 11/2015 |
| WO | WO 2017041074 | 3/2017 |

OTHER PUBLICATIONS

Ali et al., "Constraining Interwell Water Flood Imaging with Geology and Petrophysics: An Example from the Middle East," SPE 120558, Paper presented at the 2009 SPE Middle East Oil & Gas Show and Conference, Bahrain, Mar. 15-18, 2009, 11 pages.

Alkhatib et al., "Robust Quantification of Uncertainty in Heterogeneity for Chemical EOR Processes: Applying the Multi-Level Monte Carlo Method," Paper presented at the SPE Middle East Oil & Gas Show and Conference, Bahrain, Mar. 8-11, 2015; 13 pages.

Baek et al., "Comparative Study of Oil-Dilution Capability of Dimethyl Ether and Hexane as Steam Additives for Steam-Assisted Gravity Drainage," SPE-187182, Society of Petroleum Engineers, 2018, 19 pages.

Chahardowli et al., "Dimethyl ether and diethyl ether for enhanced oil recovery from conventional and fractured reservoirs," Thesis, Delft University of Technology, 2016, 183 pages.

Cho et al., "Compositional modeling and simulation of dimethyl ether (DME)-enhanced waterflood to investigate oil mobility improvement". Pet. Sci., 2018, 15, 297-304, 8 pages.

Chou et al., "CO2 Foam Field Trial at North Ward-Estes," SPE 24643, Society of Petroleum Engineers (SPE), presented at the Society of Petroleum Engineers Annual Technical Conference, Washington, D.C. 1992, 12 pages.

Clarkson et al., "Integration of microseismic and other post-fracture surveillance with production analysis: A tight gas study," Journal of Natural Gas Science and Engineering, vol. 3, No. 2, Mar. 25, 2011, 20 pages.

Creemer et al., "Efficient Use Of High Frequency Data Through Production Data Management System Implementation," SPE Intelligent Energy International, Jan. 2012, 12 pages.

Deng et al., "Study of Solvent-Assisted in-situ Bitumen Recovery," Report of Alberta Innovates, 2017, 22 pages.

Ganjdanesh et al., "Treatment of condensate and water blocks in hydraulic-fractured shalegas/condensate reservoirs," SPE J., 2016, 21(2): 1-10, 10 pages.

Giles, "Multilevel Monte Carlo path simulation," Operations Research, 56(3), May-Jun. 2008, 607-617, 11 pages.

Groot et al., "Representation of Phase Behavior and PVT Workflow for DME Enhanced Water-Flooding," SPE-179771-MS, Society of Petroleum Engineers, Mar. 21, 2016, 19 pages.

Haddadnia et al., "Dimethylether—A Promising Solvent for ES-SAGD," SPE-189741-MS, Society of Petroleum Engineers, Mar. 13, 2018, 10 pages.

Hafidz Arief et al, "Real Time Reservoir Fluid Log from Advanced Mud Gas Data," SPE Annual Technical Conference & Exhibition, Oct. 2000, 14 pages.

Heller et al., "Testing CO2-Foam for Mobility Control at Rock Creek," SPE 14519, Society of Petroleum Engineers (SPE), presented at the Society of Petroleum Engineers Eastern Regional Meeting, Morgantown, West Virginia 1985, 14 pages.

Henry et al., "Field Test of Foam to Reduce CO2 Cycling," SPE 35402, Society of Petroleum Engineers (SPE), presented at the Society of Petroleum Engineers/Department of Energy Symposium on Improved Oil Recovery, Tulsa, Oklahoma 1996, 6 pages.

Hoefner and Evans, "CO2 Foam: Results from Four Developmental Field Trials," SPE Reservoir Engineering, Nov. 1995, 9 pages.

Javanmard et al., "On Oil Recovery Mechanisms and Potential of DME-Brine Injection in the North Sea Chalk Oil Reservoirs." Industrial & Engineering Chemistry Research, 2018, 57(46), 15898-15908, 11 pages.

Jonas et al., "Evaluation of a CO2 Foam Field Trial: Rangely Weber Sand Unit," SPE 20468, Society of Petroleum Engineers (SPE), presented at the Society of Petroleum Engineers Annual Technical Conference, New Orleans, Louisiana 1990, 14 pages.

Kunz et al, "The GERG-2008 Wide-Range Equation of State for Natural Gases and Other Mixtures: An Expansion of GERG-2004," J. Chem. Eng. Data 57 : pp. 3032-3091, 2004, 60 pages.

Lemmon et al, "NIST Standard Reference Database 23: Reference Fluid Thermodynamic and Transport Properties-REFPROP," Version 9.1, National Institute of Standards and Technology, Standard Reference Data Program, Gaithersburg, 2013, 62 pages.

(56) References Cited

OTHER PUBLICATIONS

Lertliangchai et al., "A Comparative Analysis of the Prediction of Gas Condensate Dew Point Pressure Using Advanced Machine Learning Algorithms," SPE Annual Technical Conference and Exhibition, Sep. 2021, 16 pages.

Li et al., "A Comparative Study of the Probabilistic-Collocation and Experimental-Design Methods for Petroleum-Reservoir Uncertainty Quantification," SPE Journal, 16(2), Jun. 2011, 429-439, 11 pages.

Liang et al., "Crosswell Electromagnetic Inversion Constrained by the Fluid-Flow Simulator," Paper presented at the SPE Annual Technical Conference and Exhibition, Florence, Italy, Sep. 19-22, 2010; 11 pages.

Liu et al., "Numerical Modeling and Optimization of Condensate Banking Treatment in the Hydraulic-fractured Shale Gas Condensate Reservoir," URTeC:2902081, presented at 2018 URTeC conference, Houston, TX, Jul. 2018, 18 pages.

Marsala et al., "3D inversion practice for crosswell electromagnetic surveys in horizontal wells in Saudi Arabia," 85th Annual International Meeting, SEG, 2015, 4 pages.

Marsala et al., "Crosswell electromagnetic induction between two widely spaced horizontal wells: Coiled-tubing conveyed data collection and 3D inversion from a carbonate reservoir in Saudi Arabia," 85th Annual International Meeting, SEG, 2015, 4 pages.

Marsala et al., "Crosswell Electromagnetic Tomography: from Resistivity Mapping to Interwell Fluid Distribution," Paper presented at the International Petroleum Technology Conference in Kuala Lumpur (IPTC 12229), 2008, 6 pages.

Marsala et al., "First Borehole to Surface Electromagnetic Survey in KSA: Reservoir Mapping and Monitoring at a New Scale," Paper presented at the SPE Annual Technical Conference and Exhibition (SPE-146348), Denver, Colorado, Oct. 30-Nov. 2, 2011; 10 pages.

Marsala et al., "Fluid Distribution Inter-Well Mapping in Multiple Reservoirs by Innovative Borehole to Surface Electromagnetic: Survey Design and Field Acquisition," Paper presented at the International Petroleum Technology Conference (IPTC-17045), Beijing, China, Mar. 26-28, 2013; 4 pages.

Martin et al., "CO2-Foam Field Test at the East Vacuum Grayburg/San Andreas Unit," SPE Reservoir Engineering, Nov. 1995, 7 pages.

Monger et al., "The Phase Behavior of CO2-Appalachian Oil Systems," SPE Annual Technical Conference and Exhibition, Oct. 1981, 11 pages.

Odi et al., "Decline Curve Analysis in Unconventional Reservoirs Using a Variable Power Law Model: A Barnett Shale Example," Unconventional Resources Technology Conference, Jul. 2019, 24 pages.

Odi et al., "Experimental Investigation of Wet Gas Dew Point Pressure Change With Carbon Dioxide Concentration," Abu Dhabi International Petroleum Conference and Exhibition, Nov. 2012.

Odi, "Optimal Process Design for Coupled CO2 Sequestration and Enhanced Gas Recovery in Carbonate Reservoirs," Thesis for the degree of Doctor of Philosophy, Texas A&M University, Dec. 2013, 241 pages.

Ogunyomi et al., "An Approach to Modeling Producing Declin in Unconventional Reservoirs," Journal of Petroleum Exploration and Production Technology, Aug. 2017, 8(3):871-886.

Patil et al., "CO2 Foam Field Pilot Test in Sandstone Reservoir: Complete Analysis of Foam Pilot Response," SPE 190312, Society of Petroleum Engineers (SPE), presented at the Society of Petroleum Engineers Improved Oil Recovery Conference, Tulsa, 2018, 14 pages.

Piper et al., "Compressibility Factors for Naturally Occurring Petroleum Gases," SPE Annual Technical Conference and Exhibition, Oct. 1993.

Potsch et al., "A Novel Graphical Method for Determining Dewpoint Pressures of Gas Condensates," European Petroleum Conference, Oct. 1996, 3 pages.

Ratnakar et al., "Use of DME as an EOR Agent: Experimental and Modeling Study to Capture Interactions of DME, Brine and Crudes at Reservoir Conditions," SPE-181515-MS, Society of Petroleum Engineers, Sep. 26, 2016, 15 pages.

Sanders et al, "Implementation of a CO2 Foam Pilot Study in the SACROC Field: Performance Evaluation," SPE 160016, Society of Petroleum Engineers (SPE), presented at the Society of Petroleum Engineers Annual Technical Conference, San Antonio, Texas 2012, 13 pages.

Shyeh et al., "Examples of Right-Time Decisions from High Frequency Data," SPE Intelligent Energy Conference and Exhibition, Feb. 2008, 14 pages.

Siddiqui et al., "Stability and Texture of CO2/N2Foam in Sandstone" Colloids and Surfaces A: Physiochemical and Engineering Aspects, vol. 534, May 24, 2017, 26-37, 12 pages.

Sivaraman et al., "Acoustic Dew Point and Bubble Point Detector for Gas Condensates and Reservoir Fluids," Annual Technical Meeting, Jun. 1997, 7 pages.

Solbakken, "Experimental Studies of N2- and CO2-Foam Properties in Relation to Enhanced Oil Recovery Applications," Ph.D. dissertation, University of Bergen, 2015, 353 pages.

Stephenson et al., "Mobility control experience in the Joffre Viking miscible CO2 flood." SPE Reservoir Engineering 8.03, Aug. 1993, 183-188, 6 pages.

Szabries et al. "Foam Analysis at Elevated Pressures for Enhanced Oil Recovery Applications" Energy & Fuels, vol. 33, No. 5, May 16, 2019, 10 pages.

Tallon et al., "The Solubility of Water in Mixtures and Dimethyl Ether and Carbon Dioxide," J. Fluid Phase Equilibrium, 2010, 298, 60-66, 7 pages.

Tatang et al., "An efficient method for parametric uncertainty analysis of numerical geophysical models," Journal of Geophysical Research, vol. 102, No. D18, Sep. 27, 1997; pp. 21,925-21,932, 8 pages.

Valko et al., "Reservoir oil bubblepoint pressures revisited; solution gas-oil ratios and surface gas specific gravities," Journal of Petroleum Science and Engineering, Mar. 2003, 37(3-4):153-169, 17 pages.

Wagner et al., "International Equations for the Saturation Properties of Ordinary Water Substance. Revised According to the International Temperature Scale of 1990," Addendum to J. Phys. Chem. Ref. Data 16, 893 (1987), J. Phys. Chem. Ref, Data. 22, pp. 783-787, 5 pages.

Whitson et al., "Khuff Gas Condensate Development," International Petroleum Technology Conference, Nov. 2005, 19 pages.

Wilt et al., "Monitoring a Water Flood of Moderate Saturation Changes with Crosswell Electromagnetics (EM): A Case Study from Dom Joao Brazil," Paper presented at the SEG Las Vegas 2012 Annual Meeting, 2012, 4 pages.

Xue et al., "Optimal Transformations for Multiple Regression: Application to Permeability Estimation from Well Logs," SPE Form. Eval., Jun. 1997, 12(02):85-93, 9 pages.

Yang et al., "A Machine Learning Approach to Predict Gas Oil Ratio Based on Advanced Mud Gas Data," 81st EAGE Conference and Exhibition, Jun. 2019, 17 pages.

Yang et al., "Reservoir Fluid Data Acquisition Using Advanced Mud Logging Gas in Shale Reservoirs," SPE/AAPG/SEG Unconventional Resources Technology Conference, Jul. 2019, 17 pages.

Zeng et al., "Role of Gas Type on Foam Transport in Porous Media," Langmuir, 32, Jun. 2016, 6239-6245, 7 pages.

SAIP Examination Report in Saudi Arabian Appln. No. 123441402, dated Feb. 21, 2025, 16 pages (with English translation).

* cited by examiner

DEW POINT PRESSURE PREDICTION USING ISOTHERMAL CONSTANT COMPOSITION EXPANSION AND ARTIFICIAL INTELLIGENCE

TECHNICAL FIELD

This disclosure relates generally to dew point pressure prediction.

BACKGROUND

The dew point pressure of a reservoir fluid is the pressure at which the first droplet of liquid from a liquid phase condenses from a gas phase at a specific temperature. The dew point pressure is used in the management of wet gas and condensate reservoirs. Experiments used to determine the dew point pressure are based on human observation of the dew point as the pressure applied to a reservoir fluid is varied. The resulting dew point pressure is subjective, based on the particular individual observing the experiment. Additionally, such experiments can be time consuming and costly.

SUMMARY

An embodiment described herein provides a method for dew point prediction using isothermal composition expansion and artificial intelligence. The method includes obtaining constant composition expansion data of a reservoir fluid, and predicting saturation pressures for the reservoir fluid at the constant composition expansion data points using a trained machine learning model selected from multiple machine learning models that are trained using data from a generated constant composition expansion library. The method also includes determining a central tendency of the predicted saturation pressures to obtain a final saturation pressure corresponding to the constant composition expansion data for the reservoir fluid. In examples, the final saturation pressure is a dew point pressure of the reservoir fluid.

An embodiment described herein provides an apparatus comprising a non-transitory, computer readable, storage medium that stores instructions that, when executed by at least one processor, cause the at least one processor to perform operations. The operations include obtaining constant composition expansion data of a reservoir fluid and predicting saturation pressures for the reservoir fluid at the constant composition expansion data points using a trained machine learning model selected from multiple machine learning models that are trained using data from a generated constant composition expansion library. The operations also include determining a central tendency of the predicted saturation pressures to obtain a final saturation pressure corresponding to the constant composition expansion data for the reservoir fluid. In examples, the final saturation pressure is a dew point pressure of the reservoir fluid An embodiment described herein provides a system. The system comprises one or more memory modules and one or more hardware processors communicably coupled to the one or more memory modules. The one or more hardware processors is configured to execute instructions stored on the one or more memory models to perform operations. The operations include obtaining constant composition expansion data of a reservoir fluid and predicting saturation pressures for the reservoir fluid at the constant composition expansion data points using a trained machine learning model selected from multiple machine learning models that are trained using data from a generated constant composition expansion library. The operations also include determining a central tendency of the predicted saturation pressures to obtain a final saturation pressure corresponding to the constant composition expansion data for the reservoir fluid. In examples, the final saturation pressure is a dew point pressure of the reservoir fluid.

DETAILED DESCRIPTION

Accurate quantitative determination of dew point pressure is essential for effective reservoir management of wet gas and condensate reservoirs. Inaccurate estimates of dew point pressure may cause detrimental onset of condensate blockage, which can hamper production of gas in condensate wet reservoirs. Isothermal constant composition expansion (CCE) data are generally used to quantify reservoir fluid compressibility and can be used to also quantify saturation points (bubble-point or dew-point pressure) when the change in compressibility due to phase change is apparent. For wet gas fluids, the change in compressibility due to phase change is very subtle and makes it challenging to detect the dew-point pressure. As a result, it is generally difficult to quantify dew points by only using CCE experiments and generally requires visual verification of phase change in a viewing cell. This adds to the cost and complexity of determination of dew-point pressure.

Embodiments described herein enable dew point pressure prediction using isothermal constant composition expansion data and artificial intelligence. In particular, a library of reservoir fluids is generated and corresponding constant composition expansion (CCE) experiments are simulated. Machine learning models are trained using the simulated CCE data. The trained machine learning models output saturation pressures. The saturation pressures output by the machine learning model are without human bias. In examples, saturation pressures refer to pressures at which a liquid phase or a gas phase of a reservoir fluid become saturated and transitions to another phase for various reservoir fluids. The dew point pressure of a reservoir fluid is a pressure at which a small quantity of liquid forms within a large quantity of gas of the reservoir fluid. Below this pressure, condensation occurs in a wet gas reservoir. In examples, the bubble point pressure is the pressure below which vaporization occurs in a black oil or volatile oil reservoir fluids. For ease of explanation, the present techniques refer to saturation pressures, and in particular, dew point pressures. However, the present techniques can be used to determine both dew point pressures or wet gas condensates and bubble point pressures of black oil.

Figure 1:
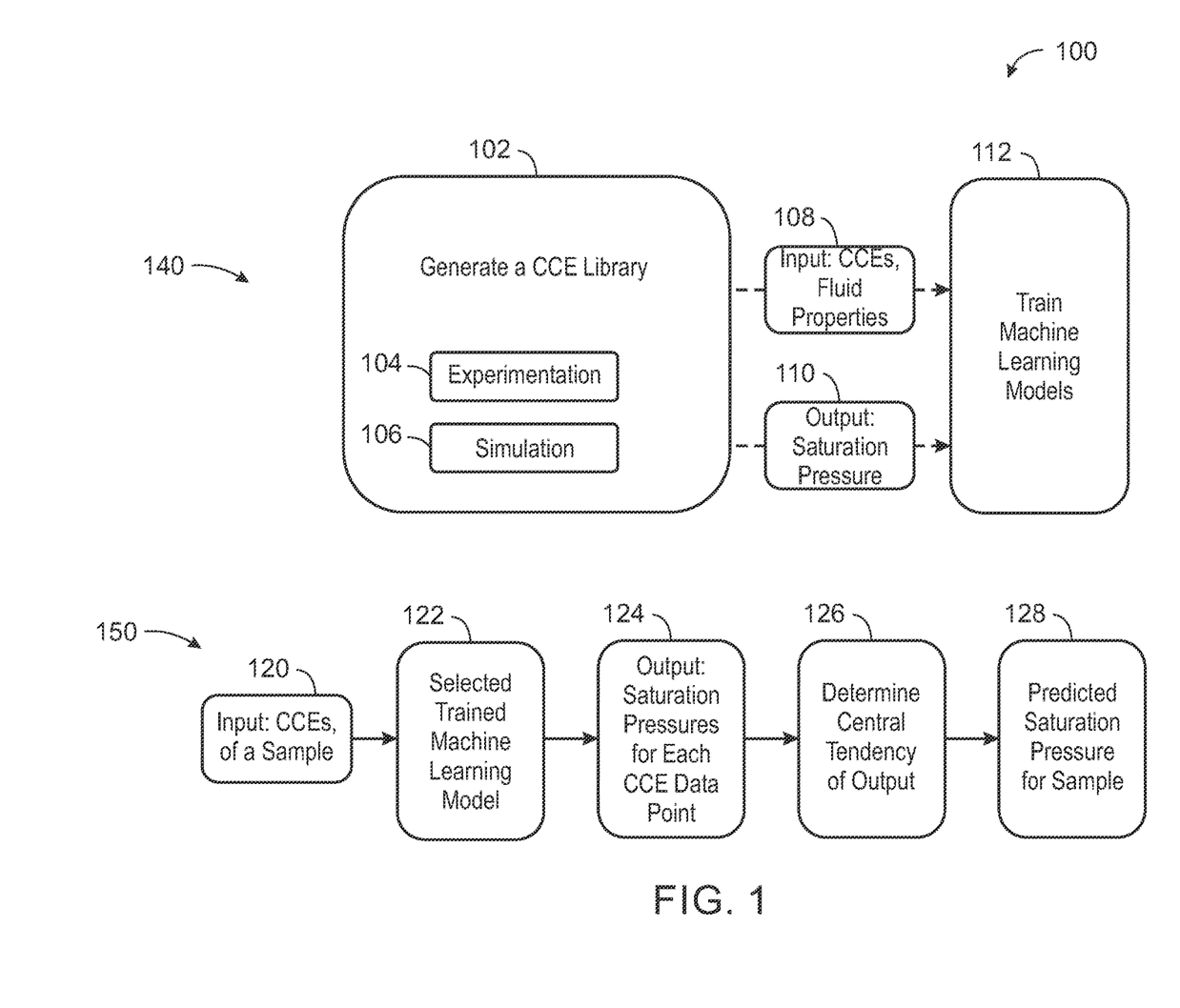
FIG. 1 is an illustration of a workflow that enables dew point pressure prediction using isothermal constant composition expansion and artificial intelligence.

FIG. 1 is an illustration of a workflow 100 that enables dew point pressure prediction using isothermal constant composition expansion and artificial intelligence. The workflow 100 includes a process 140 and a process 150 that may be executed the system 600 of FIG. 6. In the example of FIG. 1, the process 140 trains a machine learning models to predict saturation pressures. The process 150 executes the trained machine learning model to predict a final saturation pressures of a sample with CCE data. The present techniques are able to determine saturation pressures without prior knowledge of the composition of the reservoir fluids. Accordingly, the machine learning models to predict saturation pressures do not take as input compositional data.

At block 102, a library of reservoir fluid CCE data is generated. In examples, CCEs for the library of reservoir fluids are determined through experimentation, simulation, or any combinations thereof. The library of reservoir fluid CCEs includes, but is not limited to, a total compressibility, pressure, liquid density (or gas z factor), and documented saturation pressure.

In examples, the CCE data is determined via an experiment 104 (e.g., laboratory test) that measures compressibility of a reservoir fluid (e.g., volume) as a function of pressure. In embodiments, the temperature is constant at a predetermined temperature. For example, the temperature may correspond to a reservoir temperature. In some examples, the CCE of a reservoir fluid is determined by measuring a total volume of a sample of the reservoir fluid at various pressures above and below a saturation pressure, and marking the volume and pressure at the dew point. The CCE is a calculation for compressibility that can be determined by using the formula:

$$C = -\frac{1}{V}\left(\frac{\Delta P}{\Delta V}\right) \quad \text{Equation 1}$$

where C is the compressibility, V is volume, $\Delta P$ is a change in pressure, and $\Delta V$ is a change in volume. A CCE plot includes a number of data points at various compressibility values and pressures. Traditionally, the saturation pressures (e.g., dew point pressure and bubble point pressure) are determined by a visually observing the volume of the reservoir fluid while pressure is increased or decreased. Traditional determination of saturation pressures is left to human decision during observation, and is thus subject to human bias. The present techniques generate a trained machine learning model that outputs a saturation pressure based on the CCE, without human bias.

Figure 2:
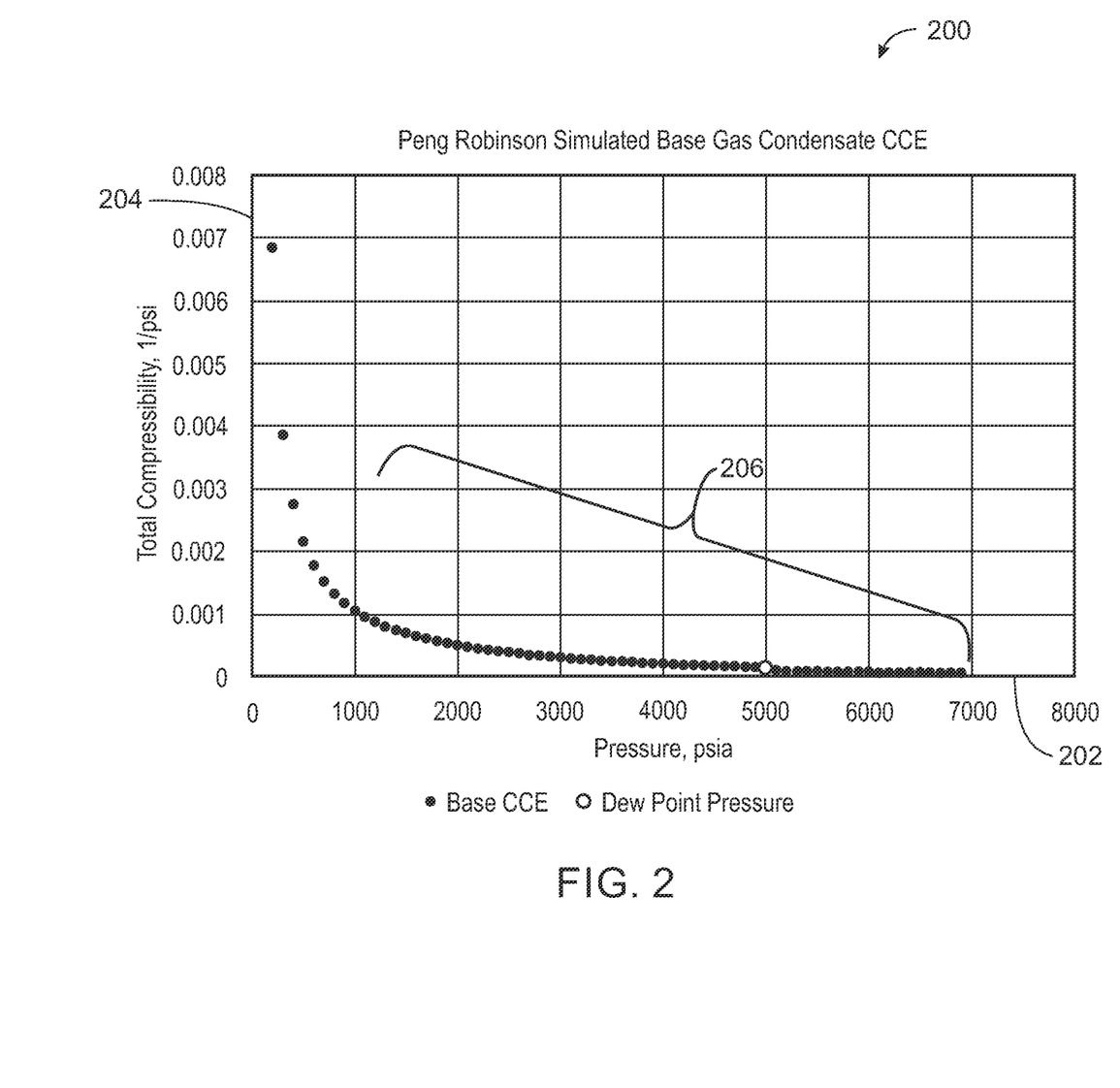
FIG. 2 is a simulated constant composition expansion for a base condensate using a cubic equation of state.

In embodiments, the reservoir fluid CCEs are obtained through simulation 106. Simulations may be based, at least in part, on equations of state (EOS). The equation of state relates the pressure, temperature, and volume of a reservoir fluid, and synthetically generates a CCE for a reservoir fluid. The equations of state represent a ground truth for the reservoir fluid, with a number of data points at various volumes and pressures. FIG. 2 is a simulated CCE 200 for a base condensate using a cubic equation of state. In the example of FIG. 2, pressure is plotted on the x-axis 202 against total compressibility on the y-axis 204. Equation of states illustrate the expected reality of CCE behavior. CCE data points 206 for the gas condensate are illustrated, along with a dew point pressure 208. In the example of FIG. 2, the cubic equation of state used to generate the CCE 200 is the Peng Robinson equation of state. In cases where the total compressibility data is unavailable, total volume can be used in the absence of total compressibility. Total compressibility can be calculated as described by Equation 1.

Simulated CCE information is stacked as illustrated in Table 1, with the following columns: total compressibility, pressure, liquid density (or gas z factor), and documented saturation pressure. The values outlined in Table 1 correspond to example compositions used for validation of trained machine learning models. The CCEs of these compositions were simulated and their dew points were determined. The machine learning process then predicted the determined dew points.

TABLE 1

Compositions of Simulated CCEs

| Simulated Experiments | CO2 mol % | C1 mol % | C2 mol % | C3 mol % | C8 mol % | C12 mol % |
|---|---|---|---|---|---|---|
| 1 | 1 | 83 | 4 | 3 | 3 | 6 |
| 2 | 4.81 | 79.81 | 3.85 | 2.88 | 2.88 | 5.77 |
| 3 | 9.17 | 76.15 | 3.67 | 2.75 | 2.75 | 5.50 |
| 4 | 13.16 | 72.81 | 3.51 | 2.63 | 2.63 | 5.26 |
| 5 | 16.81 | 69.75 | 3.36 | 2.52 | 2.52 | 5.04 |
| 6 | 20.16 | 66.94 | 3.23 | 2.42 | 2.42 | 4.84 |
| 7 | 26.12 | 61.94 | 2.99 | 2.24 | 2.24 | 4.48 |
| 8 | 0.93 | 77.57 | 3.74 | 9.35 | 2.80 | 5.61 |
| 9 | 0.89 | 74.11 | 3.57 | 13.39 | 2.68 | 5.36 |
| 10 | 0.85 | 70.94 | 3.42 | 17.09 | 2.56 | 5.13 |
| 11 | 0.82 | 68.03 | 3.28 | 20.49 | 2.46 | 4.92 |
| 12 | 0.79 | 65.35 | 3.15 | 23.62 | 2.36 | 4.72 |
| 13 | 0.76 | 62.88 | 3.03 | 26.52 | 2.27 | 4.55 |
| 14 | 0.93 | 77.57 | 3.74 | 2.80 | 9.35 | 5.61 |
| 15 | 0.89 | 74.11 | 3.57 | 2.68 | 13.39 | 5.36 |
| 16 | 0.85 | 70.94 | 3.42 | 2.56 | 17.09 | 5.13 |
| 17 | 0.82 | 68.03 | 3.28 | 2.46 | 20.49 | 4.92 |
| 18 | 0.79 | 65.35 | 3.15 | 2.36 | 23.62 | 4.72 |
| 19 | 0.76 | 62.88 | 3.03 | 2.27 | 26.52 | 4.55 |

Referring again to FIG. 1, at block 112, a machine learning model is trained to predict saturation pressure. Machine learning predicts a target parameter as a function of several inputs. There are various types of machine learning algorithms with varying approaches in relating input parameters to a target parameter. A Nystroem Kernel Support Vector Machine Regressor provided the best saturation pressure prediction when compared to other machine learning models. The Nystroem Kernel aspect of the Nystroem Kernel Support Vector Machine Regressor uses a low-rank matrix approach to approximate kernels. These kernels are then used to map the input parameters to a target parameter.

In embodiments, the CCE data is directly used to train machine learning models. The output of the trained machine learning models is the saturation pressure. The machine learning models do not use compositional data to determine the saturation pressure. In embodiments, deviations and sudden changes in the CCE are used to train machine learning models to predict saturation pressure. Based on these deviations, the machine learning model learns how to predict saturation pressures. Accordingly, the present techniques determine dew point pressures using machine learning models, regardless of the composition of the sampled reservoir fluid.

To train the machine learning models, inputs 108 to the model include the CCE library and fluid properties. Fluid properties, include for example, compressibility, liquid density (or gas z factor), and dew point pressure. In embodiments, the CCE library is divided into a training dataset, validation dataset, and test dataset. For example, the CCE library is divided into 80% training data, 10% validation data, and 10% testing data. In examples, inputs 110 to the machine learning models are total compressibility, pressure, liquid density (or gas z factor). The output 110 of the machine learning models is a target parameter, such as saturation pressure 110. The target parameter is provided for training machine learning models. In examples, using the inputs 110 and saturation parameter 112, multiple machine learning models are trained, and the best model that provides the best validation and cross validation root mean square error is selected.

Table 2 provides validation results for multiple machine learning models. In Table 2, a ranking of machine learning algorithms is given by validation and cross validation root mean square error (RMSE). In cross validation, randomized sampling is deployed across the dataset. The best model as provided in Table 2 is the Nystroem Kernel SVM Regressor, which gives a lowest error across validation and cross validation.

TABLE 2

Machine Learning Model Competition

| Machine Learning Model | Validation RMSE, psia | Cross Validation RMSE, psia |
| --- | --- | --- |
| Nystroem Kernel SVM Regressor | 172 | 155.8 |
| Nystroem Kernel SVM Regressor (Poisson Deviance) | 175.8 | 161.9 |
| Nystroem Kernel SVM Regressor (Gamma Deviance) | 175.6 | 162.2 |
| Support Vector Regressor (Radial Kernel) | 208.1 | 188.6 |
| Gradient Boosted Greedy Trees Regressor (Least Squares Loss) | 256.2 | 246 |
| Gradient Boosted Trees Regressor (Least Squares Loss) | 254.6 | 249.3 |
| Nystroem Kernel SVM Regressor (Tweedle Deviance) | 269.3 | 255.7 |
| Auto-tuned K-Nearest Neighbors Regressor (Euclidean Distance) | 290.6 | 262.3 |
| Random Forest Regressor | 318.3 | 290.7 |

The process 150 includes determining a final saturation pressure for a sample with an unknown saturation pressure. At block 120, CCE data with unknown saturation pressure is obtained. The CCE data at block 120 may be, for example, existing CCE data associated with a reservoir sample. At block 122, the inputs are provided to the selected trained machine learning model. At block 124, the trained machine learning model predicts saturation pressures of each CCE data point for a sample.

Figure 3:
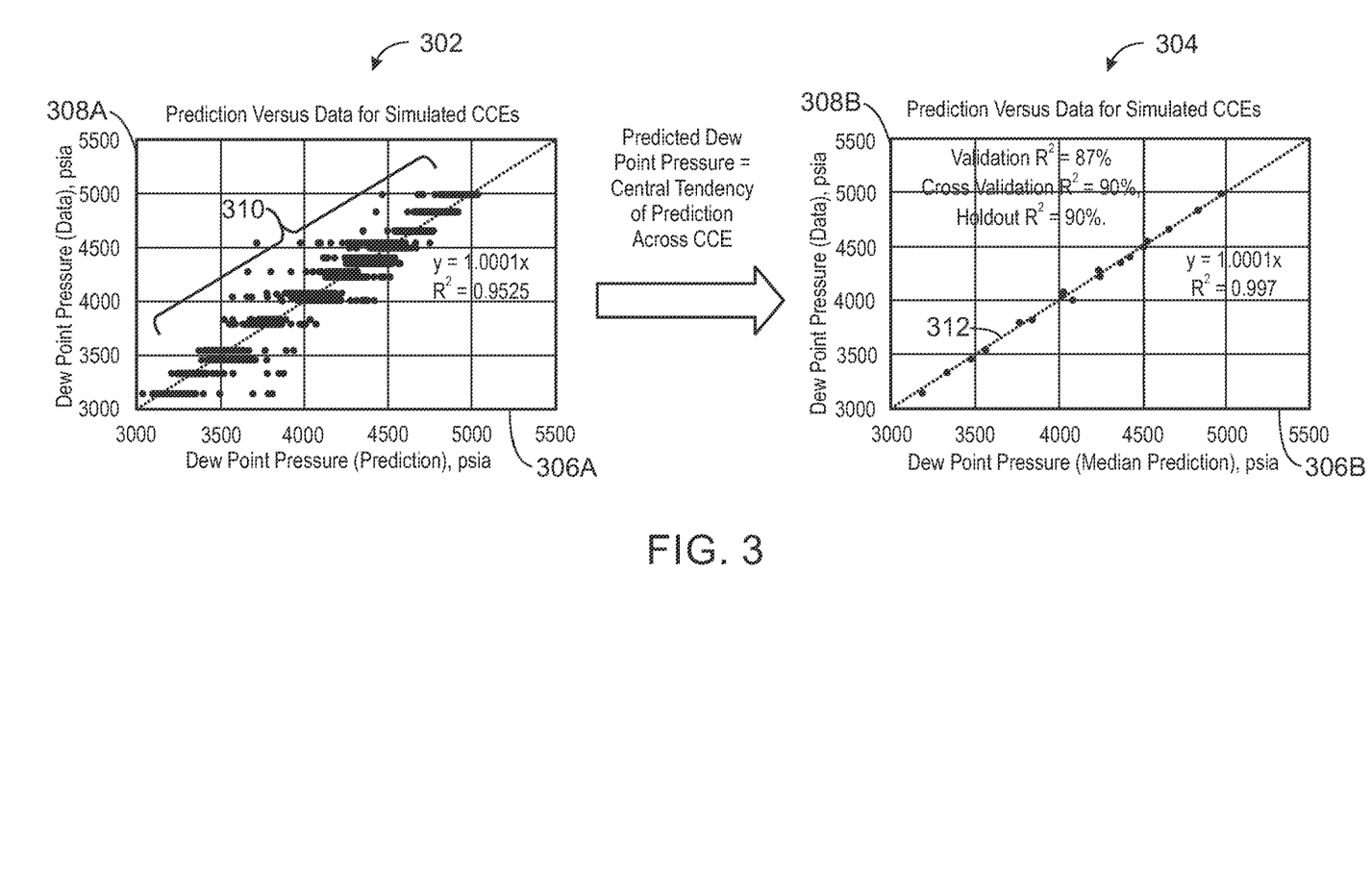
FIG. 3 is an illustration of obtaining the median of predicted saturation pressures from a trained machine learning model.

FIG. 3 is an illustration of obtaining the median of predicted saturation pressures from a trained machine learning model. In the charts 302 and 304, dew point pressure predictions are plotted along the respective x-axes 306A and 306B, and dew point pressure data is plotted along the respective y-axes 308A and 308B. Predicted saturation pressures 310 include the saturation pressures that correspond to each data point of the input CCEs. In embodiments, a final predicted dew point pressure corresponds to the central tendency 312 of the predicted saturation pressures across all CCEs. The line 312 represents a comparison between an actual dew point pressure and the predicted dew point pressure. Line 312 contains several dew point pressures illustrating that the workflow can predict several dew point pressures of the compositions outlined in Table 1. In examples, the central tendency is the median, mean, or mode of the saturation pressures. Median is the value which occupies the middle position when all the observations are arranged in an ascending/descending order. Mode is defined as the value that occurs most frequently in the data. Some data sets do not have a mode because each value occurs only once. Mean is an average of the sample values. In the chart 302, the $R^2$=0.9525 with a slope y=1.0001x. In the chart 304, the $R^2$=0.9525 with a slope y=1.0001x. The slope y in FIG. 3 illustrates the relationship between the predictive model with data plotted along the respective x-axis 306A or 306B with the dew point pressure data plotted along the respective y-axis 308A and 308B. The equation y=1.0001x illustrates an approximate 1-to-1 comparison because of the slope equal to 1.

Referring again to FIG. 1, at block 126, the central tendency of the output pressures is determined. At block 128, the final predicted saturation pressure is determined for the CCE input at block 120.

The block diagram of FIG. 1 is not intended to indicate that the workflow 100 is to include all of the components shown in FIG. 1. Rather, the workflow 100 can include fewer or additional components not illustrated in FIG. 1 (for example, additional models, additional data, and the like). The workflow 100 may include any number of additional components not shown, depending on the details of the specific implementation. Furthermore, any of the functionalities of the workflow 100 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 4:
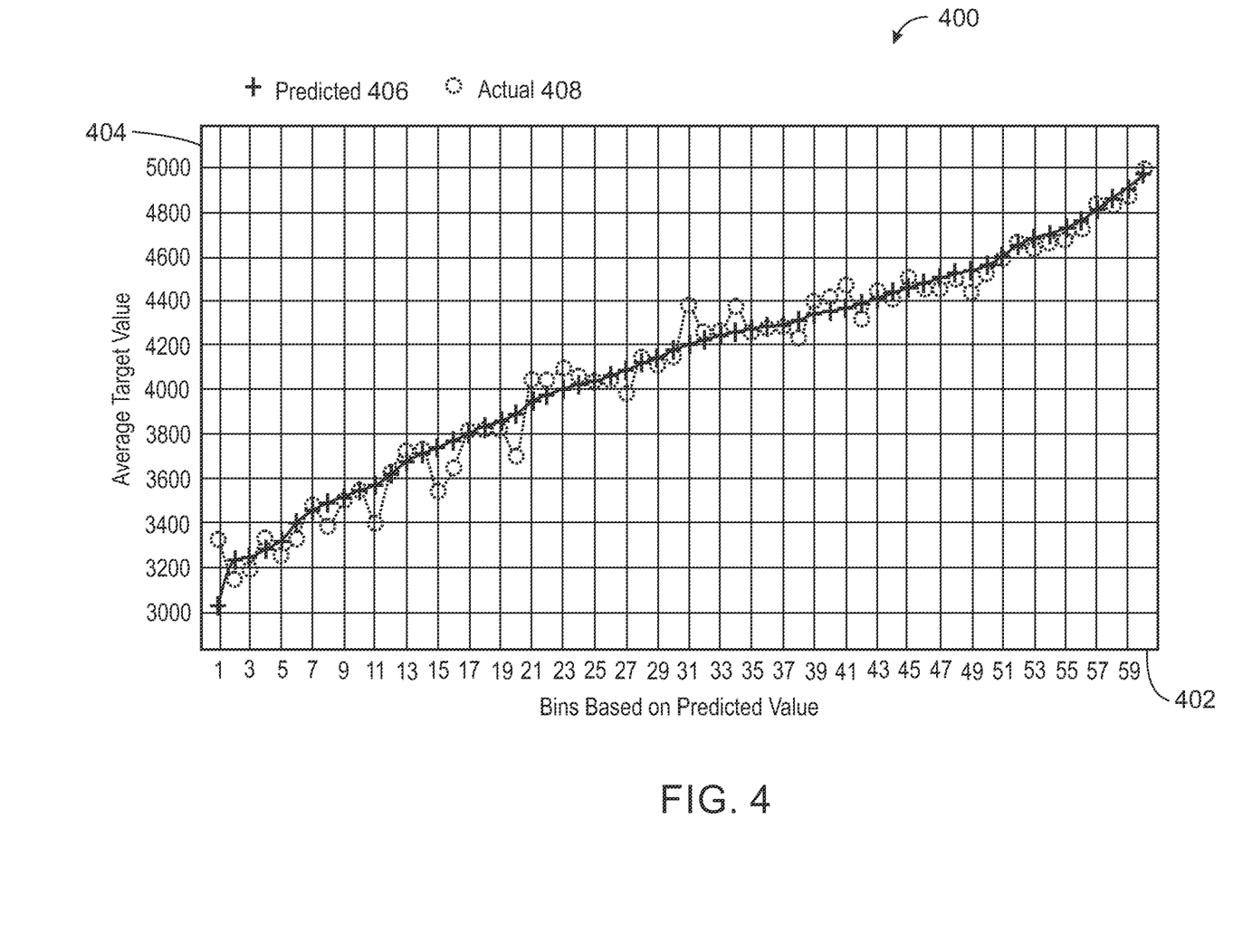
FIG. 4 is a lift chart.

FIG. 4 is a lift chart 400. The lift chart 400 illustrates the ratio between results obtained with and without the trained machine learning model. Bins based on the predicted value are plotted along the x-axis 402, and average target value is plotted along the y-axis 404. The predicted saturation pressures 406 are illustrated with crosses, and the actual saturation pressures 408 are illustrated red circles on the chart 400. The lift chart illustrates how effective the trained machine learning model is in predicting the target parameter, which is the dew point pressure. In the example of FIG. 4, the lift chart 400 the trained machine learning model is applied to hold out data, where the R-squared results for validation, cross validation, and holdout R2 was 87%, 90%, and 90%, respectively as indicated in FIG. 3.

Figure 5:
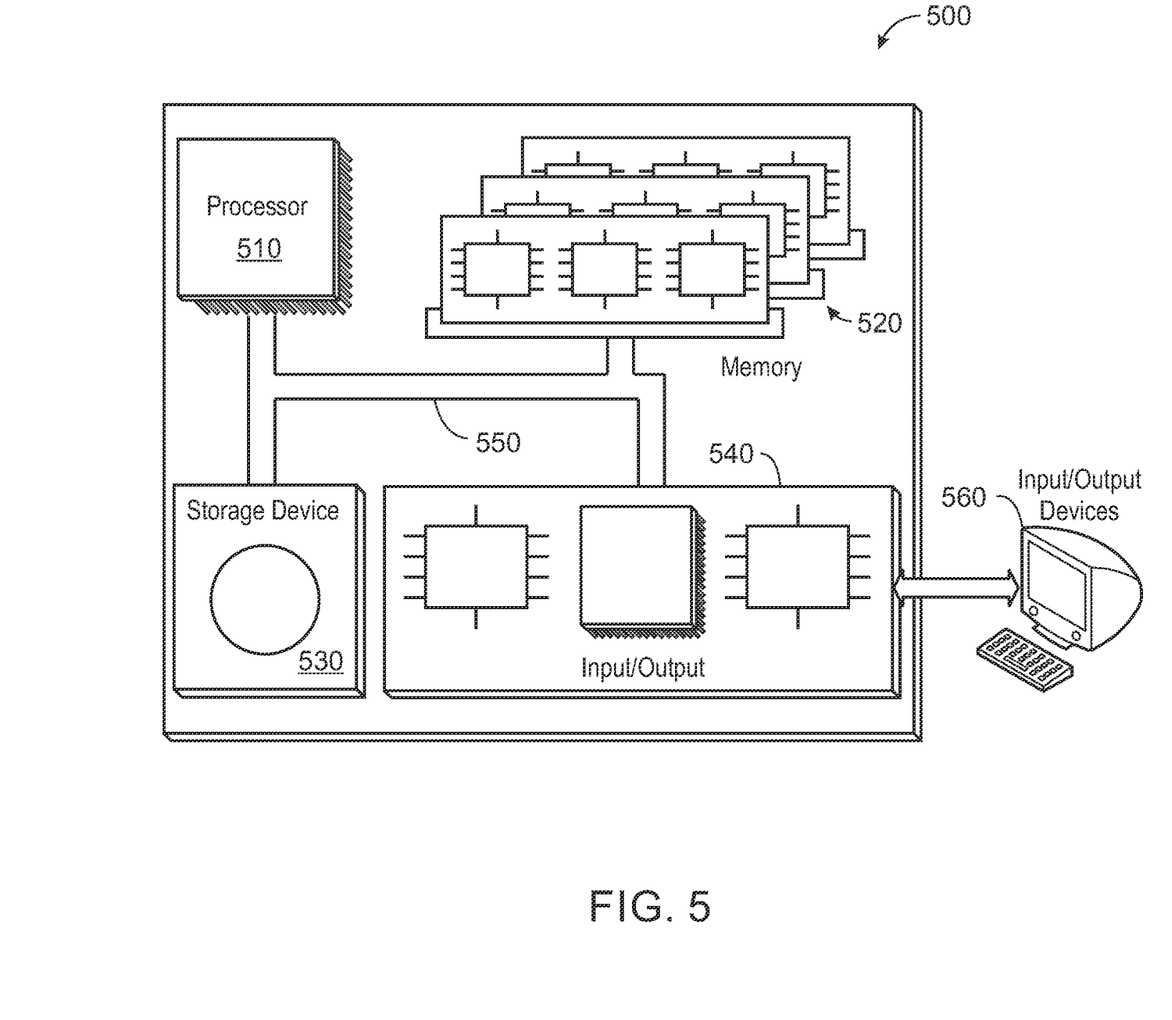
FIG. 5 is a schematic illustration of an example controller (or control system) for dew point pressure prediction using isothermal constant composition test and artificial intelligence according to the present disclosure.

FIG. 5 is a schematic illustration of an example controller 500 (or control system) for dew point pressure prediction using isothermal constant composition test and artificial intelligence according to the present disclosure. For example, the controller 500 may be operable according to the workflow 100, process 140, or process 150 of FIG. 1. The controller 500 is intended to include various forms of digital computers, such as printed circuit boards (PCB), processors, digital circuitry, or otherwise parts of a system for automated dew point pressure prediction. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output interface 540 communicatively coupled with input/output devices 560 (for example, displays, keyboards, measurement devices, sensors, valves, pumps). Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface via the input/output interface 540 at an input/output device 560.

The memory 520 stores information within the controller 500. In one implementation, the memory 520 is a computer-readable medium. In one implementation, the memory 520 is a volatile memory unit. In another implementation, the memory 520 is a nonvolatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, or a tape device.

The input/output interface 540 provides input/output operations for the controller 500. In one implementation, the input/output devices 560 includes a keyboard and/or pointing device. In another implementation, the input/output devices 560 includes a display unit for displaying graphical user interfaces.

There can be any number of controllers 500 associated with, or external to, a computer system containing controller 500, with each controller 500 communicating over a network. Further, the terms "client," "user," and other appropriate terminology can be used interchangeably, as appropriate, without departing from the scope of the present disclosure. Moreover, the present disclosure contemplates that many users can use one controller 500 and one user can use multiple controllers 500.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method, comprising:
   obtaining, with one or more hardware processors, constant composition expansion data points corresponding to a reservoir fluid;
   predicting, with the one or more hardware processors, saturation pressures for the reservoir fluid at the constant composition expansion data points using a trained machine learning model selected from multiple machine learning models that are trained using data from a generated constant composition expansion library; and
   determining, with the one or more hardware processors, a central tendency of the predicted saturation pressures to obtain a final saturation pressure for the reservoir fluid.

2. The computer implemented method of claim 1, wherein the constant composition expansion data comprises a total compressibility and a liquid density of the reservoir fluid at multiple pressures.

3. The computer implemented method of claim 1, wherein the constant composition expansion library comprises experimentally derived constant composition expansion data and synthetic constant composition expansion data.

4. The computer implemented method of claim 1, wherein the trained machine learning model selected to predict the saturations pressures has a best validation and cross validation root mean square error of the multiple machine learning models that are trained.

5. The computer implemented method of claim 1, wherein the trained machine learning model is a Nystroem Kernel Support Vector Machine Regressor.

6. The computer implemented method of claim 1, wherein the saturation pressures are dew point pressures, and the reservoir fluid is wet gas condensate.

7. The computer implemented method of claim 1, wherein the saturation pressures are bubble point pressures, and the reservoir fluid is black oil.

8. An apparatus comprising a non-transitory, computer readable, storage medium that stores instructions that, when executed by at least one processor, cause the at least one processor to perform operations comprising:
   obtaining constant composition expansion data points corresponding to a reservoir fluid;
   predicting saturation pressures for the reservoir fluid at the constant composition expansion data points using a trained machine learning model selected from multiple machine learning models that are trained using data from a generated constant composition expansion library; and
   determining a central tendency of the predicted saturation pressures to obtain a final saturation pressure for the reservoir fluid.

9. The apparatus of claim 8, wherein the constant composition expansion data comprises a total compressibility and a liquid density of the reservoir fluid at multiple pressures.

10. The apparatus of claim 8, wherein the constant composition expansion library comprises experimentally derived constant composition expansion data and synthetic constant composition expansion data.

11. The apparatus of claim 8, wherein the trained machine learning model selected to predict the saturations pressures has a best validation and cross validation root mean square error of the multiple machine learning models that are trained.

12. The apparatus of claim 8, wherein the trained machine learning model is a Nystroem Kernel Support Vector Machine Regressor.

13. The apparatus of claim 8, wherein the saturation pressures are dew point pressures, and the reservoir fluid is wet gas condensate.

14. The apparatus of claim 8, wherein the saturation pressures are bubble point pressures, and the reservoir fluid is black oil.

15. A system, comprising:
    one or more memory modules;
    one or more hardware processors communicably coupled to the one or more memory modules, the one or more hardware processors configured to execute instructions stored on the one or more memory models to perform operations comprising:
    obtaining constant composition expansion data points corresponding to a reservoir fluid;
    predicting saturation pressures for the reservoir fluid at the constant composition expansion data points using a trained machine learning model selected from multiple machine learning models that are trained using data from a generated constant composition expansion library; and
    determining a central tendency of the predicted saturation pressures to obtain a final saturation pressure for the reservoir fluid.

16. The system of claim 15, wherein the constant composition expansion data points comprises a total compressibility and a liquid density of the reservoir fluid at multiple pressures.

17. The system of claim 15, wherein the constant composition expansion library comprises experimentally derived constant composition expansion data and synthetic constant composition expansion data.

18. The system of claim 15, wherein the trained machine learning model selected to predict the saturations pressures has a best validation and cross validation root mean square error of the multiple machine learning models that are trained.

19. The system of claim 15, wherein the trained machine learning model is a Nystroem Kernel Support Vector Machine Regressor.

20. The system of claim 15, wherein the saturation pressures are dew point pressures, and the reservoir fluid is wet gas condensate.

21. The system of claim 15, wherein the saturation pressures are bubble point pressures, and the reservoir fluid is black oil.

\* \* \* \* \*